Aug. 7, 1934.  W. B. FREEMAN  1,969,068
APPARATUS FOR SUPPORTING ANNULAR ARTICLES
Filed Oct. 24, 1933
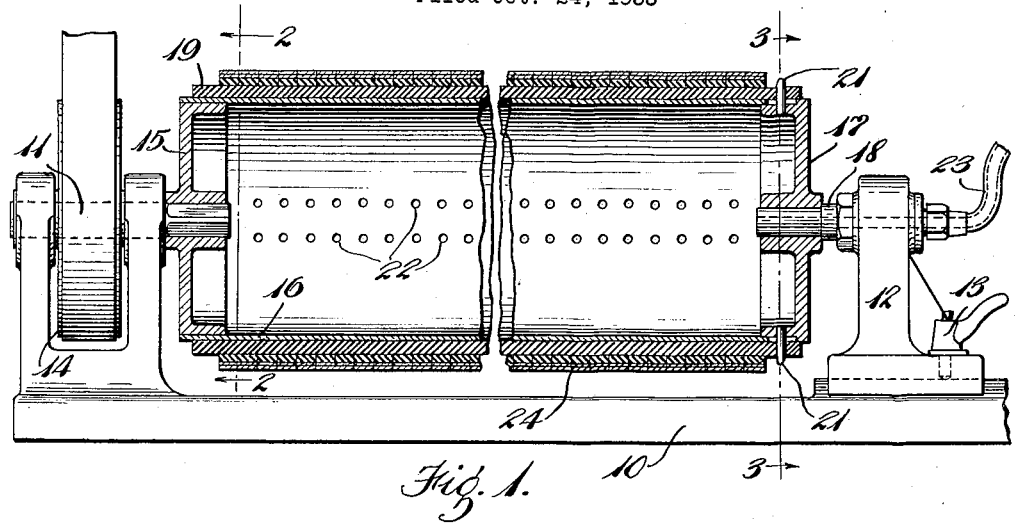
Fig. 1.
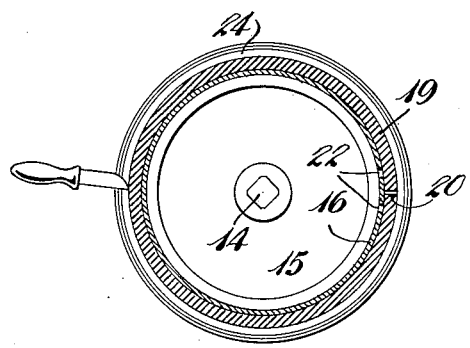
Fig. 2.
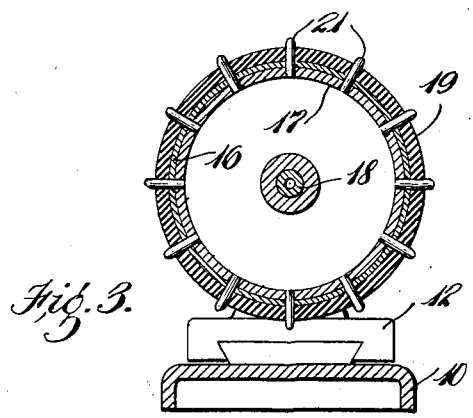
Fig. 3.
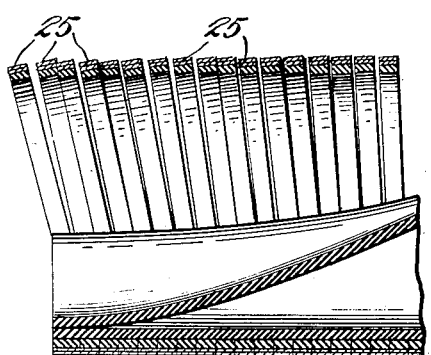
Fig. 4.
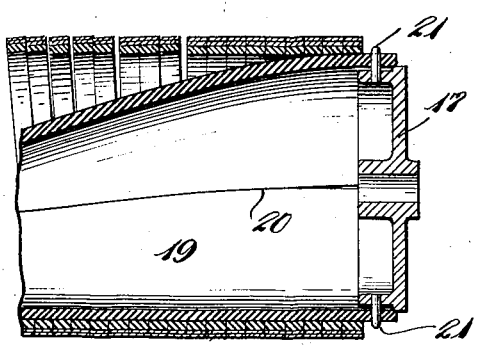
Inventor,
Walter B. Freeman
By Eakin & Avery Attys.

Patented Aug. 7, 1934

1,969,068

UNITED STATES PATENT OFFICE 1,969,068

APPARATUS FOR SUPPORTING ANNULAR ARTICLES

Walter B. Freeman, Cuyahoga Falls, Ohio, assignor to The B. F. Goodrich Company, New York, N. Y. a corporation of New York Application October 24, 1933, Serial No. 694,935

5 Claims. (Cl. 164—69)

This invention relates to apparatus for supporting annular articles during manufacturing processes and is especially useful in producing annular rings of rubberized or rubber material such as annular belts or other lathe-cut articles.

The principal objects of the invention are to provide a convenient support for such an annular article during the building and cutting operations and to provide for ready removal from the support when the goods are finished.

Other objects will appear from the following description and the accompanying drawing.

Of the drawing:

Fig. 1 is a front elevation of a lathe showing the preferred form of work supporting apparatus with the work shown in section.

Fig. 2 is a section taken on line 2—2 of Fig. 1 showing the cutting operation.

Fig. 3 is a section on line 3—3 of Fig. 1.

Fig. 4 is a longitudinal section of the work supporting apron and its pulling means, showing the annular articles being removed therefrom.

Referring to the drawing, the numeral 10 designates the bed of a lathe having bearings for a head-stock spindle 11 and supporting a sliding tail stock 12 adapted to be clamped thereto by a bolt 13. The head-stock spindle 11 has fixed thereto a pulley 14 and a driving head 15 to which is attached a hollow cylindrical drum 16.

The opposite end of the drum 16 is supported by a removable head 17 which is journaled on the tail stock spindle 18 carried by the tail stock. Surrounding the metal drum is a cushion sheet of elastic rubber 19 which is laid around the drum with its longitudinal edges abutting as at 20. The head 17 is provided with radially projecting dowel pins 21 which pass through openings provided therefor in the cushion sheet.

To retain the cushion sheet in place, the drum 16 is perforated along one side by a series of apertures 22 arranged in two rows. The spindle 18 is made hollow and is connected to a source of reduced air pressure (not shown) by a flexible hose 23. The seam 20 of the cushion sheet is disposed midway of the two rows of apertures and when the atmospheric pressure in the drum is reduced the margins of the cushion will be held by the atmospheric pressure without the drum.

Material 24 for forming belts or other annular articles is wound upon the drum over the cushion. After one convolution of material has been applied the vacuum may be released. When the material has been wound in place the drum may be revolved and the applied material cut to form annular articles such as the belts 25. Due to the resilience of the rubber cushion, the belts will remain in place until the material has been entirely divided into articles. The cushion also prevents dulling of the knives used in cutting the rings.

After the cutting operation is complete, the tail stock is backed off. The cushion 19 may then be removed by pulling the head 17 axially. This causes the cushion 19 to be elongated and reduced in circumference, thereby relieving the clamping action of the finished rings. The rings are drawn off with the cushion and due partly to its pliability and partly to its split construction the cushion readily collapses releasing the rings as shown in Fig. 4.

I claim:

1. Apparatus for supporting annular articles during manufacture thereof, said apparatus comprising a cylindrical drum, a cushion of resilient rubber around said drum and unattached thereto, upon which the articles may be supported, and means engaging the edge of the cushion and movable axially away from the drum for stretching the cushion axially to permit its withdrawal from the drum.

2. Apparatus for supporting annular articles during manufacture thereof, said apparatus comprising a cylindrical drum, a cushion sheet of resilient rubber wrapped thereabout with its edges abutting each other lengthwise of the drum, and means for drawing the cushion sheet axially from the drum to remove annular articles supported thereby.

3. Apparatus for supporting annular articles during manufacture thereof, said apparatus comprising a cylindrical drum formed with two axially disposed rows of apertures, a resilient rubber cushion wrapped about said drum with its edges abutting between the rows of apertures, and means for exhausting the drum to retain said cushion in place.

4. Apparatus for supporting annular articles during manufacture thereof, said apparatus comprising a cylindrical drum having a fixed head and a removable head, a sheet of resilient cushion rubber about the peripheral surface of the drum but unattached thereto, and means carried by the removable head and engaging said cushion whereby said cushion may be axially withdrawn from the drum with said head.

5. Apparatus for supporting annular articles during manufacture thereof, said apparatus comprising a rotatable drum having a fixed head and a movable head, a sheet of resilient cushion rubber about the peripheral surface of the drum but unattached thereto, means for exhausting said drum to retain the sheet of cushion material upon its surface, and means carried by the removable head and engaging said cushion whereby said cushion may be axially withdrawn from the drum with said head.

WALTER B. FREEMAN.